ABSTRACT OF THE DISCLOSURE

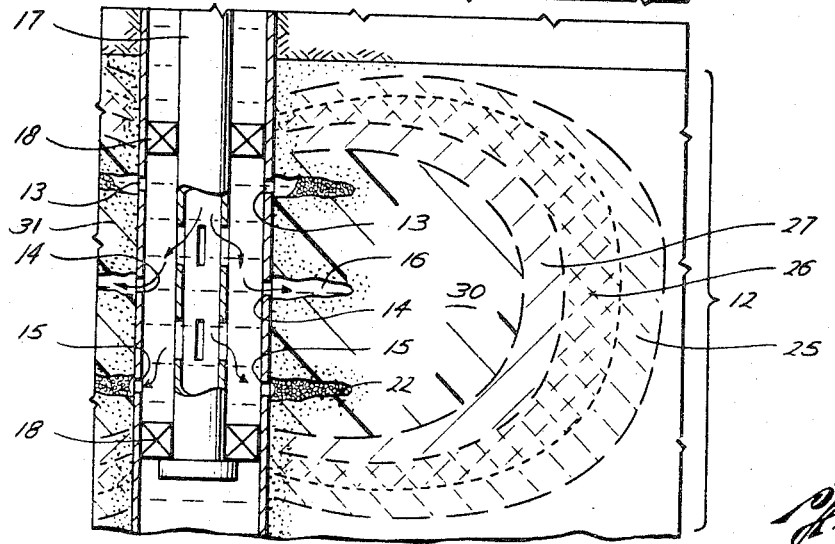
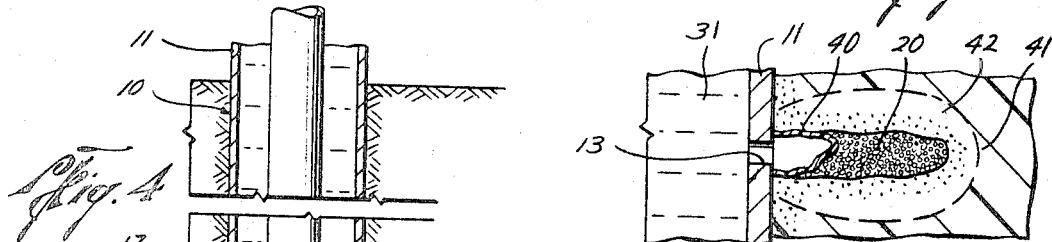
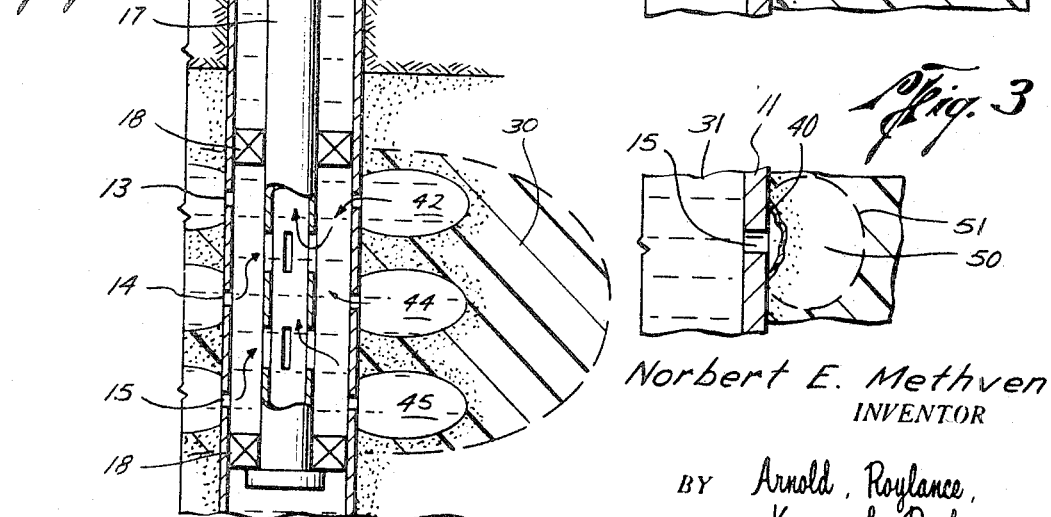
Norbert E. Methven
INVENTOR
BY Arnold, Roylance,
Kruger & Durkee
ATTORNEYS 3,487,877
CONTROLLING CONSOLIDATION OF PERMEABLE
EARTH FORMATIONS
Norbert E. Methven, Houston, Tex., assignor to Oil Base, Inc., Houston, Tex., a corporation of California
Filed Dec. 27, 1967, Ser. No. 693,874
Int. Cl. E21b 33/138
U.S. Cl. 166—295                16 Claims

An oil base driving fluid comprising an oil phase and asphaltous plastering material is employed to drive a resin formulation into an incompetent earth formation for purposes of consolidating the formation. The driving fluid forms a filter cake or sheath at the fluid-formation interface which ensures that the resin is not underdisplaced or overdisplaced. By selecting the amount of solid weighting material or asphaltous plastering material in the oil base driving fluid, a preselected amount of invasion of oil beyond the sheath is permitted thus flushing the resin from the invaded region to ensure an effective and efficient perforation into the oil bearing formation.

BACKGROUND OF THE INVENTION

This invention relates to a method for consolidating earth formations for purposes of producing an oil well or the like. More particularly, this invention is concerned with the use of oil base driving fluids to control the region of consolidation of an incompetent earth formation consolidated with a resin formulation and thus improve well productivity.

The prior art recognizes the technique of consolidating earth formations in an oil well or the like to prevent sand or other formation material from accompanying the oil product when the well is produced. When a well in drilled into an incompetent formation containing oil or gas, e.g., an unconsolidated or poorly consolidated sandstone formation, sand eroded from the formation flows into the well bore with the formation fluids and causes numerous operating problems, often requiring workovers or abandonment of the well.

Many methods have been suggested for avoiding the problems involved in producing oil from incompetent formations. In particular, U.S. Patents 3,294,166 and 3,294,168 disclose methods for consolidating an incompetent formation which involve injecting into the formation a resinous material which subsequently sets in the formation and binds formation particles together to render them self-sustaining. The resin can be injected into the formation in an amount so that the formation particles are surrounded by resin and are bound together without blocking the interstices between formation particles and destroying the formation permeability. Thus, following consolidation the well will produce oil or gas without accompanying sand.

However, when such a resin injection approach is utilized for purposes of consolidating a formation, it is extremely important that the resin is not underdisplaced or unduly overdisplaced into the formation. In the case of underdisplacement, the resin will remain in the borehole and may plug the casing or formation. On the other hand, overdisplacement of the resin into the formation results in those parts of the formation directly surrounding the well not being consolidated. In such a situation, the consolidated portion can be driven remotely from the well itself and the effect of consolidation will not be realized.

When a competent formation is perforated, there remains after perforation a channel or limited void space in the formation outside the casing providing a surface area through which the well may be produced. However, in an incompetent formation, such a discrete channel does not normally exist in the formation due to collapse of the rock around the channel. Thus, at best, there may be a density gradient in the formation where the rock proximate the perforation is less dense. Accordingly, if a formation of this type is consolidated with a resin formulation as in the prior art and the consolidation is carried out precisely, without overdisplacement or underdisplacement of the resin, the collapsed material in the area of the original perforation will be cemented in place by the resin and accordingly, there will be very little surface area through which the well can produce. Also, if an incompetent formation is sand packed and then consolidated, a similar situation will exist wherein consolidation of the sand packing right up to the casing perforation will occur and very little surface area will be available for well production.

Also, in those wells wherein foreign material exists in the perforation channel as a result of the perforating technique employed, or where some rock has fallen into the channel, the use of resin consolidation will result in the cementing of this material in place, thus serving to block the formation and reduce well productivity.

Accordingly, in each of these instances, even if resin displacement into the formation is undertaken accurately and without any underdisplacement or overdisplacement, production difficulties can accrue because of the lack of any technique for controlling the precise region and degree of invasion of the formation by the consolidating resin to afford a producing channel for the formation.

SUMMARY OF THE INVENTION

It is accordingly an object of this invention to provide a novel method for controlling the region of consolidation of a formation with a resin and thus improve well productivity.

It is a further object of this invention to provide a method for consolidating an earth formation in an oil producing strata so as to leave producing channels in the strata proximate the borehole despite the incompetency of the formation. It is a further object of this invention to provide a method for consolidating earth formations employing a driving fluid having an oil base to prevent aqeous contamination of the formation.

It is a further object of this invention to provide a method for consolidating earth formations wherein the degree of invasion of the driving fluid into the formation behind the resin can be selectively controlled.

It is among the further objects of this invention to provide a method for consolidating an earth formation with a resinous material in such a manner as to permit foreign materials including the driving fluid to be readily flushed from the borehole when the well commences production.

These and other objects of the invention are achieved by the method of the instant invention which involves driving a resinous material into an incompetent formation in an amount sufficient to consolidate the formation yet retain formation permeability using an oil base driving fluid having known plastering properties; applying a differential pressure at least slightly greater than the pressure exerted by the formation but below the formation fracture pressure to said oil base driving fluid to produce a filter cake at the fluid-formation interface and to produce an oil fluid loss through said filter cake to invade said formation behind said resin a preselected distance; and retaining said resin and driving fluid in said formation for a sufficient time to permit the resin to cure and render the formation beyond the oil invaded region self-sustaining.

BRIEF DESCRIPTION OF THE DRAWINGS

The instant invention will be more particularly understood with reference to the accompanying drawings which illustrate a subterranean formation and how the formation is treated by the instant novel method.

FIGURE 1 is a sectional view of a cased borehole through an oil producing strata showing the resinous material in the formation ahead of the driving fluid and also showing formation pretreatment materials invading the formation beyond the resin.

FIGURE 2 is a detail sketch of a perforated section of the formation showing enlargement of a perforation channel or limited void on the formation side of the casing by the method of the instant invention.

FIGURE 3 is a sketch showing use of the instant invention to create a channel where the incompetency of the formation has resulted in virtually no channel into the oil producing formation.

FIGURE 4 is a sectional view of a cased borehole through an oil bearing strata formation showing schematically the structure of the formation after consolidation according to the method of the instant invention.

DESCRIPTION OF THE PREFERRED EMBODIMENTS

Consolidation of subterranean earth formations is effected by admixing a curable resinous material such as a phenol formaldehyde resin or an epoxy resin with a polymerizing catalyst for the resin in a suitable hydrocarbon solvent and injecting this solution into the pore space of a suitably prepared earth mass or formation. As will be described in more detail hereinafter, it may be desirable to pretreat the formation prior to the injection of the resin-catalyst solution to remove unbound water from the formation or to otherwise pretreat the formation for the resinous material.

Once the resinous material has been injected into the pore space of a suitably prepared permeable formation, it is retained in the formation for a sufficient period of time for a solid resinous reaction product to form, separate from the solvent and deposit upon the particles of the formation to cement them together. By selecting the amount of resin introduced into the formation, i.e., the concentration of the resin solution, the formation may be completely plugged or, may be consolidated while retaining the permeability of a formation and permitting production through the consolidated region. The instant invention is primarily concerned with controlling the region of consolidation in this latter instance wherein permeability of the formation is to be retained.

Accordingly, in the context of resin consolidation techniques known in the prior art, the instant invention provides a method for controlling the region of consolidation to permit the creation of channels or limited voids in the formation through which production may effectively be carried out. Thus, the mixture of resinous material, curing agent, and solvent is driven into the formation utilizing an oil base driving fluid which has plastering properties and which will form a filter cake or sheath at the formation-liquid interface. Since this sheath is not readily permeable by the liquid in the driving fluid, the use of such a driving fluid virtually ensures that the resin-catalyst mixture is properly injected into formation without underdisplacement or overdisplacement. Moreover, the ability to exercise control over the permeability of the sheath to make it more or less permeable to the oil in the driving fluid readily permits the operator to create channels into the formation through which the formation may be produced.

Referring now to FIGURE 1, there is shown in an illustrative drawing borehole 10 lined with casing 11 passing through oil producing formation 12. The formation is illustrated on only one side of the borehole; however, it is understood that the formation exists in the fashion illustrated circumferentially around the borehole.

Formation 12 is typically sandstone or a like incompetent formation which if put on production will erode sand or other earth matter from the formation and produce said with oil.

Casing 11 has been perforated at 13, 14, and 15, and at similar positions circumferentially around the casing. It is desirable that after such perforations are accomplished that there remain channels or voids such as channel 16 opposite perforation 14 to expose an area of the oil bearing formation to permit oil to flow into the borehole and thence to the surface. However, as is illustrated in FIGURE 1, the channel 20 opposite perforation 13 is at least partially filled with debris 21 resulting from collapse of channel 20. In addition, debris 21 may be foreign matter introduced into the formation by the perforation technique employed. For example, if bullet perforation is employed, gun debris such as the remnants of the casing-piercing projectile will remain in the formation.

Opposite perforation 15, it may be seen that the entire channel has collapsed because of the incompetency of the formation, thus providing only a region 22 opposite the perforation which comprises matter which is less densely compacted than is the remainder of the formation. This situation illustrated opposite perforation 15 would also exist in substantially the same fashion if the well had been sand packed after the perforation was carried out.

Accordingly, it will be seen that the incompetency of the formation has resulted in destruction of producing channels opposite the perforations. Conventional resin consolidation would only consolidate this formation without improving the producing channels.

To effect resin consolidation of formation 12, it may be necessary to first pretreat the formation to receive the resin. The techniques of pretreatment with oil-displacing fluids, water-displacing fluids, and spacer fluids is known in the art and is discussed in particularly in U.S. Patents 3,294,166 and 3,294,168, referred to above.

Briefly, if the formation to be treated is an oil-bearing formation, it may in certain circumstances be desirable to displace the crude oil from the area of the formation to be consolidated. This may be accomplished with a hydrocarbon fluid that is miscible with the crude oil in the formation and is of comparatively low density. Diesel oil, kerosene, or like mid-fractions of petroleum distillates may be utilized for this purpose.

Following oil displacement, it is then preferred to remove connate water, e.g., liquid water which exists in formation naturally or introduced by use of a water-based drilling mud which has traveled into the interstices between formation particles by capillary action. Several different types of water removing fluids are known to the art and include oil solutions of a suitable surfactant such as N-fatty alkyl-1,3-diamino propane or a suitable water-displacing alcohol such as methanol, ethanol, or isopropyl alcohol.

Following the water displacing fluid, a spacer fluid has been employed on occasion in the art to prevent premature precipitation of the resin when an epoxy resin is employed. Suitable spacer fluids are nonreactive with the epoxy resin employed and also serve as solvents for the epoxy resin solution. Commonly an aromatic hydrocarbon oil is employed for this purpose.

Accordingly, referring again to FIGURE 1, it may be seen that these formation pretreatment steps have been carried out by injection of first an oil-displacing fluid 25 following by a water-displacing fluid 26 and a spacer fluid 27.

Behind these formation treatment fluids is resin solution which, as stated above, may be any suitable plastic or resinous material curable in the formation to effect consolidation. The resin is itself displaced into the formation by oil base driving fluid 31 which resides in the borehole.

Each of the fluids is sequentially injected into the formation downwardly through tubing 17 centrally disposed within casing 11. The perforated region of the casing may be sealed off by packers 18 and accordingly, as each fluid is pumped down central tubing 17 and through the slots therein into the formation through the perforations in the casing it displaces the preceding fluid outwardly. As will be appreciated by those skilled in the art, the isolation of the perforated zone with packers may not be necessary depending upon the downhole conditions encountered.

It will be appreciated that if the oil producing zone is at the very bottom of the borehole, at most, only an upper packing seal between the casing and the central fluid transport tube 17 would be required.

In accordance with the instant novel method, resin solution 30 is driven into the formation by an oil base driving fluid 31. This oil base driving fluid has plastering properties and accordingly, when it encounters the fluid-formation interface at the interior of each channel opposite the perforations in the casing, the driving fluid forms a filter cake or sheath on the wall of the formation and thus displaces the resin solution accurately into the formation. This buildup of filter cake or sheath virtually eliminates the danger of overdisplacement or underdisplacement of the resin.

In addition, the instant invention provides for controlling the permeability of this filter cake or sheath produced by the driving fluid to permit an oil filtrate from the driving fluid to pass through the sheath to overdisplace the resin solution slightly and invade a marginal portion of the formation surrounding each perforation. Thus, if a perforation channel exists or partially exists in the formation, the instant novel method can be used to enlarge that channel. If complete collapse of the formation has filled the perforation channel, a perforation channel or void can be created.

This oil filtrate invading the marginal zone around the perforation channel will effectively flush resin from this area, and accordingly, after the resin is permitted to cure, this invaded zone will remain unconsolidated. Upon commencement of production of the well, the unconsolidated sand from which the resin has been flushed will be eroded by the oil flow which will also dissolve the filter cake or sheath produced by the drive fluid. Any debris, foreign material, or unconsolidated matter in the region of the perforation channel will be flushed of any consolidating resin and will flow back up the borehole when the well is put on production.

The selection of an oil base fluid as the driving fluid ensures that the filtrate beyond the filter cake or sheath is a hydrocarbon oil which cannot adversely effect formation permeability. In some instances where the minerals in the formation are subject to hydration with water, an aqueous invasion can cause swelling of the formation sand destroying the return permeability of the formation and limiting the productivity of the well. Use of the driving fluid of this invention does not permit such an aqueous invasion.

Accordingly, now referring to FIGURE 2, it may be seen that channel 20 opposite perforation 13 has become coated on its interior surface with a filter cake or sheath 40 which forms at the formation-liquid interface when oil base driving fluid 31 is forced into the channel. In FIGURE 2, the composition of the oil base driving fluid has been so selected to permit an oil filtrate to penetrate sheath 40 and invade the formation for a distance of several inches to the approximate region defined by line 41. Accordingly, area 42 between sheath 40 and line 41 is essentially flushed of resinous material and will remain unconsolidated after curing of the resin. When the formation is produced, essentially all of the material including debris 21 within channel 20 and that unconsolidated portion of the formation within line 41 will be eroded from the formation and will pass through perforation 13 up the borehole. After this erosion has taken place, a situation such as is illustrated in FIGURE 4 will exist wherein region 30 of the formation is consolidated, thus preventing production of sand through the well while channels 42, 44, and 45 have been formed opposite each of the perforations, each of these channels having sufficiently large surface areas to enable the well to produce efficiently.

If a situation is encountered as shown in FIGURE 3, a similar effect is produced. In FIGURE 3, virtually the entire channel has been blocked by collapse of the surrounding formation into the perforation channel, or by a sand packing undertaken following perforation. Driving fluid 31 again forms a sheath or filter cake 40 at the fluid-formation interface.

The driving fluid employed in this instance will preferably permit oil filtrate to invade the formation for a prescribed distance, thus flushing resin out from spheroidal volume 50. Upon cure of the resin, all that material within line 51 will have remained unconsolidated, will be produced and hence provide an efficient production channel in the formation.

The driving fluid

The oil base driving fluid employed in accordance with the instant invention may be basically similar in composition to oil base drilling fluids which have plastering properties and which are well known in the art.

Most preferably, the oil base driving fluids employed in the method of the instant invention are comprised of an oil mixing fluid, such as diesel oil; a plastering agent, typically blown asphalt in a colloidal-type state; and a gel-producing agent such as calcium napthenate in sufficient amount to impart a satisfactory gel-like property to the fluid. Also, a small amount of water is also included in the fluid, usually less than about 5 percent by volume.

A fluid containing blown asphalt with a gel producer such as calcium napthenate will exhibit plastering properties and will form a sheath on the formation face when pumped down a borehole under pressure. However, the sheath formed by such a composition containing only asphalt, mixing oil, and a gel-producing agent would be fairly permeable to the oil in the driving fluid itself and consequently, use of such a simple composition would result in a considerable amount of oil filtrate passing through the sheath and invading the formation thus flushing resin out of the invaded zone.

Accordingly, the sheath impermeability may be increased by the addition to the driving fluid of a weighting material such as barium sulfate or calcium carbonate or by the addition to the driving fluid of a lost circulation material such as particles of natural asphalt, e.g., (gilsonite, glance pitch, grahamite, etc.) or particulate air blown asphalt, which material has a melting point of about 250° F. to about 320° F. and having a penetration of 25° C. of from zero to about 3. These loss circulation materials are more fully disclosed and discussed in U.S. Patent 2,773,670.

By addition to the driving fluid of the instant invention of finely divided barium sulfate or calcium carbonate, the penetrability of the sheath created at the formation-fluid interface can be increased so as to control the amount of fluid lost through the sheath and accordingly control the area around each perforation channel from which resinous material is flushed. Thus, for example, if a considerable amount of oil penetration beyond the sheath is desired, a fluid containing diesel oil, blown asphalt, plastering agent, calcium napthenate, and a moderate amount of a finely ground weighting agent such as barium sulfate or calcium carbonate might be used to weight the material to 8 or 10 pounds per gallon. Normally, an oil base fluid weighted to about 10 pounds per gallon has sufficient plastering for the novel method of this invention. If it is desired, the amount of barium sulfate or calcium carbonate added to the composition can be increased to weight the fluid to 20 pounds per gallon.

Fluid loss through the sheath can also be broadly controlled by adding discrete particles of a lost circulation asphalt, as discussed above, to the basic fluid composition. The combination of lost circulation asphalt with a small amount of weighting material, so as to produce an overall fluid having a density of about 8 to about 10 pounds per gallon, can afford a composition with virtually no fluid loss through the sheath even at extreme temperatures and pressures which might be encountered in a very deep hole. Generally, the lost circulation material is added in amounts from about 5 to about 25 pounds per barrel of fluid. This will vary with desired permeability, amount of weight material and the nature of the formation. By selection of the amount of weighting material and lost circulation asphalt, the amount of oil invasion through the sheath can be varied from as little as a few grain diameters to several inches.

In accordance with this invention, prior to resin consolidation, a core sampling of the formation to be consolidated may be recovered and brought to the surface. By testing this core the driving fluid formulation to give the desired amount of fluid loss invasion can be readily prepared thus enabling accurate control of the size of the perforation channels. Temperatures encountered in the perforated zone will also affect sheath permeability and fluid loss as appreciated by those skilled in the art.

It will be understood that the blown asphalt which is utilized in the basic driving fluid formulation together with mixing oil and the gel-producing agent is normally of a lower melting point range than lost circulation asphalt. This plastering agent asphalt commonly exists in a colloidal state in the fluid whereas lost circulation asphalt exists as discrete particles. The blown asphalt which is used as a plastering agent in the driving fluid in accordance with the methods of this invention commonly have a penetration of about 6 to about 14 at temperatures in the range of 77° F.

In general, the formulation of oil base fluids having plastering properties is well known in the art and is more fully discussed in U.S. Patents 2,316,967, 2,316,968, and 2,475,713. Typically, when using air blown asphaltous plastering materials, it is desirable to use a mixing oil having an aniline point of about 150° to 160° F. Furthermore, as the amount of particle material, i.e., weight material or lost circulation asphalt, is increased, it is increasingly necessary to provide the fluid with sufficient gel strength to prevent settling of the particles.

As discussed above, calcium naphthenate is an effective gel producer. Normally, the calcium naphthenate is produced in situ in the fluid by adding calcium oxide and napthenic acid to the fluid. In the presence of the small amount of water in the fluid, these compounds form calcium napthenate. Also, calcium oxide will react with water to form calcium hydroxide which increases gel strength.

Other additives such as the petroleum sulfonates may be added to the driving fluid in the event water contamination of the driving fluid is anticipated.

Displacement of resin formulation

In conducting the method of the instant invention, after the formation pretreatment by oil-displacing and water-displacing fluids has been conducted and a suitable spacer fluid has been injected into the formation as desired, the resin formulation is then pumped into the formation. The resin formulation is then followed in tube 17 by a "pill" of a few barrels of an oil base driving fluid having plastering properties as described above. The amount of driving fluid should be sufficient to occupy the entire free volume in the region of the perforated zone, for example, the volume between the spacers 18 illustrated in FIGURE 1.

Upon pumping the pill of driving fluid down the transport tube 17, the resin will be driven into the formation.

A differential pressure is then applied to the driving fluid to produce the sheath or filter cake at the fluid formation interface. The pressures employed here are greater than the formation pressure but less than the formation fracture pressure, since it can be appreciated that if formation fracture is achieved, the driving fluid will escape into any such fracture, rendering control of the positioning of the resin formulation impossible. Pressures in the range of from about 5 to over 1,000 pounds per square inch may be used for sheath formation.

It will further be appreciated that although the permeability of the sheath formed by the oil base driving fluid can be controlled by selecting the amount of weighting material or lost circulation material added to the driving fluid that the amount of pressure applied to the fluid will also affect oil penetration through the sheath. Accordingly, following displacement of the resin formulations, the amount of pressure exerted on the pill of driving fluid may also be regulated below the formation fracture pressure to produce the desired amount of oil invasion beyond the sheath.

Resin formulations

The resin formulations employed in the instant invention are known in the art. Some typical resin formulations are fully discussed in Patents 3,294,166 and 3,294,168, mentioned above.

As stated above, formulations include a solvent, a resinous material or plastic, and a curing agent.

Most commonly, the hydrocarbon solvents useful for dissolving the resinous material contain a substantial proportion of aromatic hydrocarbon, preferably about 50% by weight. Either a single aromatic hydrocarbon or a mixture of aromatic hydrocarbons with nonaromatic hydrocarbons may be used. The proportional amount of aromatic hydrocarbon which is employed in this solvent preparation effects the amount of time that it will take the resin to partially react and come out of solution and begin depositing on the formation particle.

As an example of one resin system, the epoxy resin materials which may be employed for formation consolidation comprise those epoxy monomers possessing more than one vicinal-epoxy group:

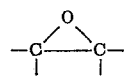

The epoxy monomers may be saturated or unsaturated, and may be aliphatic, cycloaliphatic, aromatic, or heterocyclic. These materials include the polyepoxy, polyethers of polyhydric phenols obtained by reacting a polyhydric phenol with a halogen-containing epoxide or a dihalohydrin in the presence of an alkaline medium. Other suitable polyepoxides include the glycidyl polyethers of polyhydric phenols obtained by condensing polyhydric phenols with epichlorohydrin. These compounds are also well known in the art. Aliphatic and cycloaliphatic epoxides which are also well known in the art may also be used; however, this latter group of epoxides is normally not preferred because of their higher cost.

Preferred curing agents which are used to polymerize the above-described polyepoxides in resin consolidation of earth formation are hydrocarbon-soluble amines which serve a dual purpose. These compounds serve as curing agents to convert the polyepoxide into an insoluble thermosetting and infusible resin. These amines also act as surfactants and aid in getting the surface of formation particles wet with the paritally cured epoxy resin. Suitable amines include hydrocarbon-soluble polyamines possessing one or more 6-membered carbocyclic ring, i.e., a cycloaliphatic or aromatic ring. Preferably, polyamines of this type having at least one amino or alkyl substituted amino group attached directly to the ring structure. Typical useful amine curing agents are 1,3-diaminocyclopentane, bis (3-methyl-4-aminocyclohexyl) methane and the like. Other suitable amines are amply discussed in U.S. Patent 3,294,168.

In addition to the curing agent, the rate of the curing reaction between the polyepoxides and the amine-curing agents may be modified by the use of suitable cure rate modifiers such as admixtures of lower aliphatic ketones.

The novel method of this invention can also be employed with phenol formaldehyde resin consolidation systems with equal effectiveness. It is pointed out that the resin formulation which is employed is not critical to the conduct of this invention. Rather, the instant invention is concerned with controlling the displacement and the area of displacement of the resin formulation in the formation rather than the precise resin formulation itself.

The following examples are illustrative.

A series of sand samples were made by manually packing #5 Clemtex sand into pipe nipples and vibrating the nipple for 10 minutes. The packed nipples were then immersed in an oil bath and the sand was pretreated by displacement from one end sequentially with 3 pore volumes of diesel oil as an oil displacement fluid; 3 pore volumes of isopropyl alcohol as a water displacement fluid; and 1½ pore volumes of an aromatic oil as a spacer fluid.

Into each packed sand sample was then injected 1½ pore volumes of a solution of epoxy resin and curing agent in a solvent. The formulation employed was expressly for consolidation of earth formations and is sold by Shell Oil Company under the trademark "Eposand." Each sample was driven into the formation using the driving fluid indicated at the pressure shown. After curing at 160° F. for 20 hours, the sand samples were cored, cut into one inch lengths and tested for compressive strength.

The results are set forth in Table I.

5. The method of claim 1 wherein said resinous material is a vicinal polyepoxide.

6. The method of claim 1 wherein said resinous material is a phenol-formaldehyde resin.

7. The method of claim 1 including the steps for preparing the formation for said resinous material by:
 (a) flushing the formation to be consolidated with an oil-displacing fluid; and
 (b) sequentially flushing the formation to be consolidated with a water-displacing fluid.

8. A method for forming production channels in an incompetent porous oil-bearing formation in fluid communication with a borehole comprising:
 (a) preparing a solution of a resinous material and an amine-curing agent in a hydrocarbon solvent;
 (b) driving said solution into said formation with an oil base driving fluid containing an asphaltous plastering material, a gel-producing agent, and a finely divided weight material;
 (c) applying pressure below the formation fracture pressure to said driving fluid to produce a partially oil-permeable filter cake at the fluid-formation interface and to produce an oil fluid loss through said filter cake to invade said formation by a preselected distance;
 (d) retaining said resin in said formation for sufficient time for said resin to cure and render said formation beyond the invasion of said oil self-sustaining; and
 (e) producing said well and eroding the incompetent region of said formation invaded by said oil.

9. The method of claim 8 wherein said solution comprises a vicinal polyepoxide and an amine-curing agent in a hydrocarbon solvent.

10. The method of claim 8 wherein said asphaltous plastering material is colloidally dispersed, air-blown as-

TABLE I

| Example | Driving fluid | Additive | Diff. pressure, p.s.i. | Compressive strengths, p.s.i. | | | |
|---|---|---|---|---|---|---|---|
| | | | | 1st inch | 2nd inch | 3rd inch | 4th inch |
| 1 | Fluid A[1] | | 500 | Unconsolidated | Soft | 2,286 | 1,905. |
| 2 | do | CaCO₃ (to 8.5 p.p.g.) | 500 | ½ unconsol., ½ soft | 762 | 2,159 | 1,905. |
| 3 | do | CaCO₃ (to 8.5 p.p.g.) | 500 | do | 318 | 2,159 | 2,540.[2] |
| 4 | do | 5 p.p.g. LCM[3] | 500 | Unconsolidated | 381 | 1,270 | 1,524. |
| 5 | do | 20 p.p.g. LCM[3] | 500 | ½ unconsol., ½ soft | 1,270 | 2,413 | 2,603. |
| 6 | do | CaCO₃ to 12.5 p.p.g | 500 | ½ unconsol., ½ well consol | 3,175 | 3,683 | 2,667.[2] |
| 7 | do | CaCO₃ to 12.5 p.p.g | 300 | do | 2,450 | Well consol | |
| 8 | do | CaCO₃ to 12.5 p.p.g | 500 | do | 1,812 | 1,812 | 1,651. |
| 9 | Eposand | | 0 | 1,715 | Well consol | 1,968 | Well consol. |
| 10 | Diesel | | 0 | Unconsolidated, screwdriver penetrates with ease | | | |

[1] Fluid A is an oil base fluid made in accordance with U.S. Patent 2,475,713 and sold by Oil Base, Inc. under the trademark "Black Magic Supermix." The fluid contains mixing oil, asphalt plastering agent and calcium napthenate.
[2] Packed by a falling sand packing device.
[3] Lost circulation material of air blown asphalt sold under the trademark "Formaseal" by Oil Base, Inc.

What is claimed is:

1. A method for controlling consolidation of incompetent formations proximate to a well borehole which comprises:
 (a) driving a resinous material into said incompetent formation with an oil base driving fluid having plastering properties;
 (b) applying pressure below the formation fracture pressure to said oil base driving fluid to produce a filter cake at the fluid-formation interface and to produce an oil fluid loss through said filter cake to invade said formation beyond said filter cake by a preselected distance; and
 (c) retaining said resin in said formation ahead of said driving fluid for a sufficient time to cure and render the formation beyond the invasion of said oil self-sustaining.

2. The method of claim 1 wherein said oil base driving fluid contains an asphaltous plastering material.

3. The method of claim 2 wherein said oil base driving fluid additionally contains finely divided weight material.

4. The method of claim 2 wherein said oil base driving fluid contains up to about 25 pounds per barrel of discrete particles of an asphalt lost circulation material.

phalt.

11. The method of claim 8 wherein said driving fluid contains up to about 55 pounds per barrel of discrete particles of an asphalt lost circulation material.

12. The method of claim 8 wherein said gel-producing agent is calcium naphenate.

13. A method for creating limited voids in an incompetent formation penetrated by a perforated cased borehole wherein perforation channels beyond perforations in said casing have collapsed which comprises:
 (a) driving a resinous material into said incompetent formation through said perforations in said casing with an oil base driving fluid having plastering properties;
 (b) applying pressure above the formation pressure but below the formation fracture pressure to said driving fluid to produce a filter cake at the fluid formation interface and to provide an oil fluid loss through said filter cake to invade said formation beyond said filter cake by a preselected distance sufficient to flush said resinous material from a region corresponding to a desired producing channel;
 (c) retaining said resin in said formation ahead of said driving fluid for a sufficient time to cure and render the formation beyond the invasion of said oil self-sustaining; and (d) relieving said pressure to below said formation pressure to dissolve said filter cake and erode the invaded portion of said formation into said borehole.

14. In the method of consolidating an incompetent formation wherein a curable resinous material is injected into said formation down a borehole and is permitted to cure, the improvement which comprises:
    (a) driving said resinous material into said formation with an oil base fluid having plastering properties;
    (b) maintaining a pressure on said driving fluid to produce an oil invasion into marginal portions of said formation flushing resin from said invaded portions;
    (c) relieving said pressure to permit formation material in said invaded regions to be eroded into the borehole.

15. The method of claim 14 wherein said driving fluid comprises an oil fluid base, an asphaltous plastering agent, and a gel-producing agent.

16. The method of claim 15 wherein said driving fluid additionally contains from 5 to 25 pounds per gallon of particulate asphalt material.

References Cited

UNITED STATES PATENTS

| | | | |
|---|---|---|---|
| 2,316,367 | 4/1943 | Miller | 252—8.5 |
| 2,475,713 | 7/1949 | Miller | 252—8.5 |
| 2,773,670 | 12/1956 | Miller. | |
| 3,047,067 | 7/1962 | Williams et al. | 166—33 |
| 3,123,138 | 3/1964 | Robichaux | 166—33 |
| 3,294,166 | 12/1966 | Havenaar et al. | 166—33 |
| 3,336,980 | 8/1967 | Rike | 166—33 |
| 3,347,314 | 10/1967 | Schuster | 166—35 X |

OTHER REFERENCES

Bleakley, W. B., Where We Stand on Sand Consolidation. In Oil & Gas Journal, Mar. 13, 1967, pp. 87–93.

ERNIE R. PURSER, Primary Examiner

IAN A. CALVERT, Assistant Examiner

UNITED STATES PATENT OFFICE
CERTIFICATE OF CORRECTION

Patent No. 3,487,877                                      January 6, 197

Norbert E. Methven

It is certified that error appears in the above identified patent and that said Letters Patent are hereby corrected as shown below:

Column 1, line 38, "in" should read -- is --. Columns 9 and 10, Table I, in the furthest right-hand column in the entry corresponding to Example 5, the figure "2,603" should read -- 2,063 --.

Signed and sealed this 5th day of May 1970.

(SEAL)
Attest:

Edward M. Fletcher, Jr.                    WILLIAM E. SCHUYLER, JR.
Attesting Officer                              Commissioner of Patents